United States Patent [19]

Garcera et al.

[11] Patent Number: 4,849,104
[45] Date of Patent: Jul. 18, 1989

[54] METHOD OF ASSEMBLING A CERAMIC SUPPORT SEPARATOR ELEMENT MODULE AND RESULTING MODULE

[75] Inventors: Daniel Garcera, Tarbes; Jacques Gillot, Odos, both of France

[73] Assignee: Societe Anonyme dite Societe des Ceramizues Techniques, France

[21] Appl. No.: 126,984

[22] Filed: Nov. 30, 1987

[30] Foreign Application Priority Data

Dec. 3, 1986 [FR] France .............................. 86 16932

[51] Int. Cl.⁴ ...................... B01D 23/06; B23P 11/02
[52] U.S. Cl. .................................. 210/323.2; 210/340; 29/451
[58] Field of Search .................. 210/323.2, 340, 341, 210/346; 29/450, 451, 445; 264/162

[56] References Cited

U.S. PATENT DOCUMENTS 4,640,774 2/1987 Garcera et al. ................. 210/323.2

FOREIGN PATENT DOCUMENTS 431863 1/1934 United Kingdom .
2047400 11/1980 United Kingdom .

Primary Examiner—Rodney B. Bovernick
Assistant Examiner—Jay Ryan
Attorney, Agent, or Firm—Sughrue, Mion, Zinn, Macpeak & Seas

[57] ABSTRACT

A filter module comprises a plurality of parallel substantially tubular filter elements each of which comprises a ceramic support. Two apertured end plates are attached to a protective casing and each filter element is fixed via flexible seals into respective apertures in these end plates. The module is assemble by a method which begins with molding the blanks from an elastomer material that is resistant to organic solvents and to corrosive liquids and has a Shore A hardness between 30 and 95 and an elastic elongation per unit length in excess of 10%. Each blank can have any form of outside surface and has an internal cavity with a surface matched to the ideal external shape of a filter element, except that its dimensions are slightly smaller than the corresponding dimensions of the filter element. The resulting blanks are then fitted onto the ends of the filter elements. The outside surfaces of the blanks are then machined to match them to the shape of the openings in the end plates, so producing the seals previously mentioned. The filter elements are then fitted into the casing between the plates in such a way that the seals are held in compression between the elements and the plates.

18 Claims, 7 Drawing Sheets

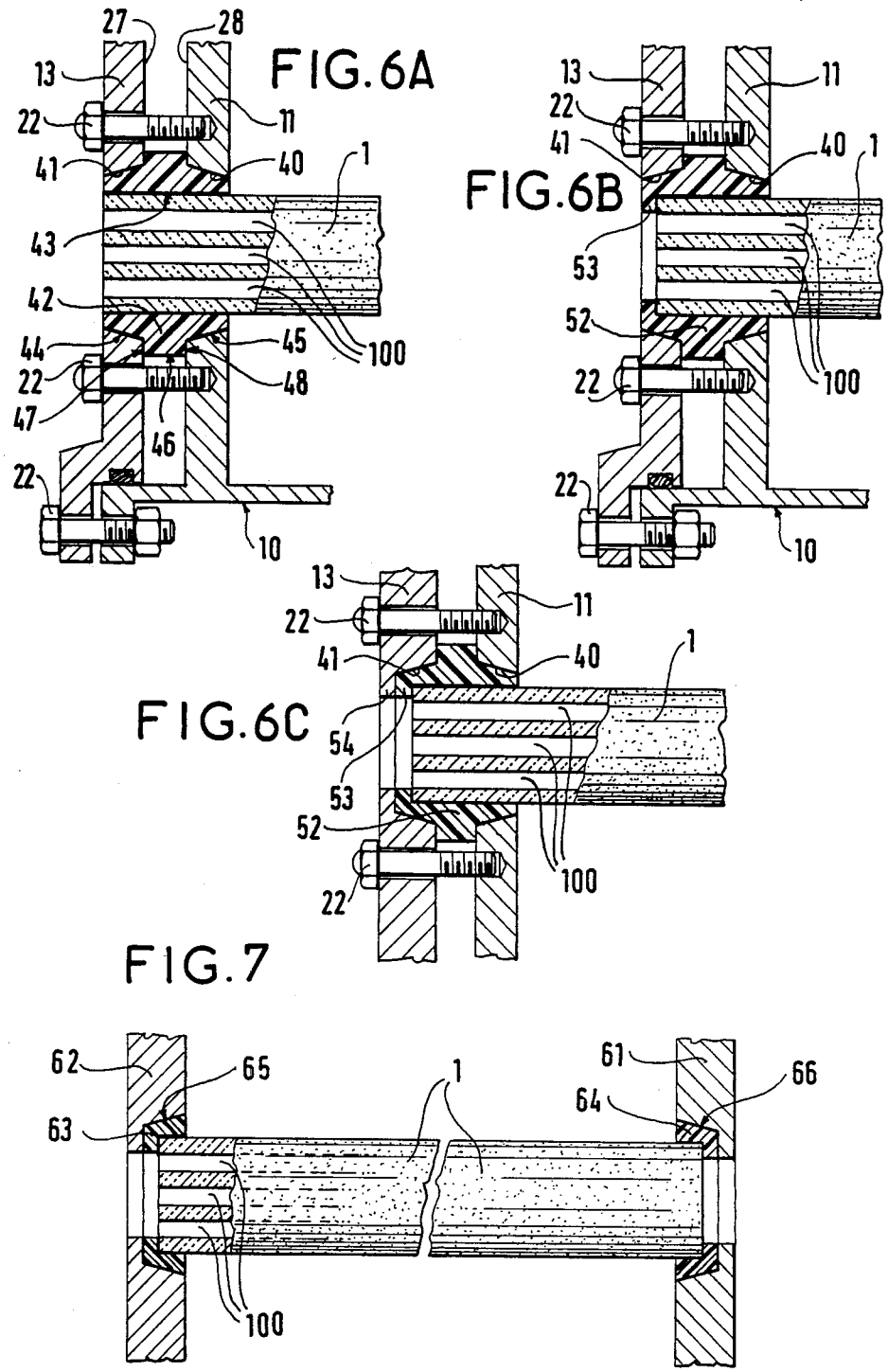

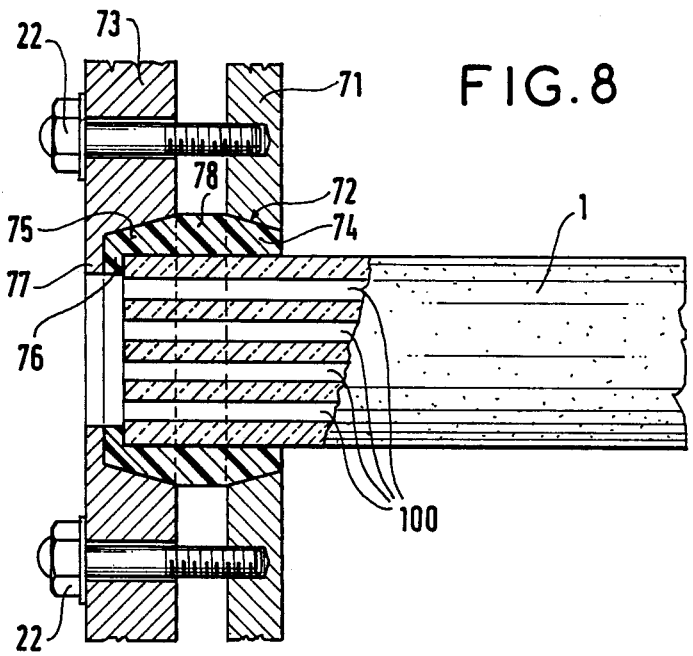
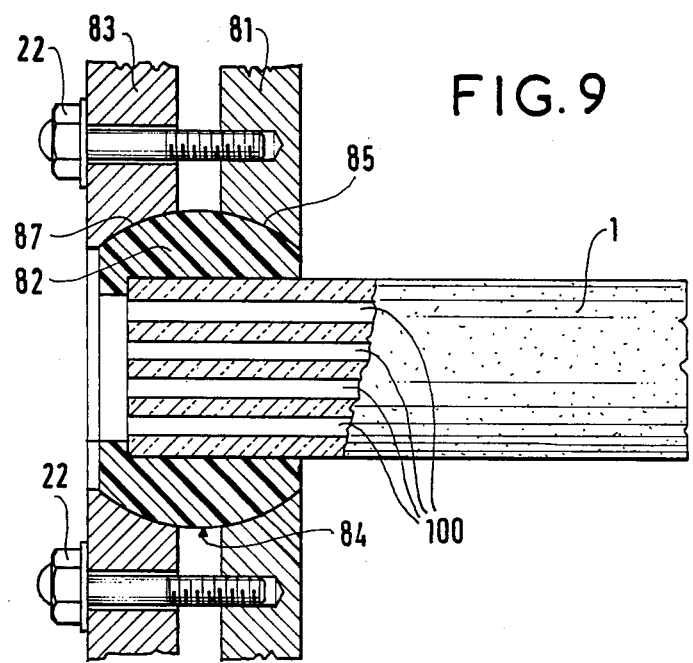

METHOD OF ASSEMBLING A CERAMIC SUPPORT SEPARATOR ELEMENT MODULE AND RESULTING MODULE

BACKGROUND OF THE INVENTION

1. Field of the Invention

The present invention concerns a method of assembling a ceramic support separator element module, the elements being disposed parallel to each other with their respective ends fixed into two plates through the intermediary of flexible polymer seals.

By separator elements there is meant in this instance either porous ceramic elements making it possible to effect separation by a screening effect through pores of predetermined size, that is to say filtering, or porous ceramic elements carrying on their surface a semi-permeable membrane made from a polymer or other material making it possible to effect separation by processes such as reverse osmosis, pervaporation or any other membrane process of this type.

To be more precise, use is made of separator elements having a tubular or quasi-tubular geometry, in particular a multi-channel type geometry, as described in the following publications:

J. GILLOT and D. GARCERA—"Nouveaux Media Filtrants Céramiques pour Microfiltration Tangentielle et Ultrafiltration"—FILTRA 84 conference, Sté Francaise de filtration—October 1984—PARIS—France.

J. GILLOT—G. BRINKMAN—D. GARCERA—"New Ceramic Filter Media for Crossflow Microfiltration and Ultrafiltration"—Fourth World Filtration Congress—Apr. 22-24, 1984—OSTEND—Belgium.

Broadly speaking, a filter module functioning according to the tangential filtration mode comprises:
two separator elements disposed in parallel,
two end plates to which the separator elements are fixed by means of flexible seals, and
a cylindrical outer casing to which the end plates are fixed.

The distance between the end plates (the length of the separator elements) is generally much greater than the outside diameter of the plates.

There is thus obtained an assembly which delimits a cavity in which circulates the liquid to be filtered or retentate (the external side of the end plates and the internal side of the tubes or channels of multi-channel elements) and a cavity in which the permeate is recovered (contained between the two end plates, the outside of the separator elements and the inside of the casing), the two cavities communicating only via the membrane.

The seals whereby the separator elements are assembled to the end plates thus have two main functions:
mechanical retention of the separator elements, and
sealing between the cavities for the liquid to be filtered and the permeate, in addition to various ancillary functions:
absorbing by virtue of their elasticity differences between thermal expansion of the separator elements and the casing of the module, and
contributing to damping of vibration of the separator elements.

A major problem arising in implementing an assembly of this kind results from the fact that it is very difficult—or even impossible—to machine a porous ceramic without causing cracks which strongly compromise its mechanical properties, while in cases where machining is possible it is always an extremely costly process. In this respect ceramics differ markedly from other materials, such as metals, with which these problems do not arise. As they have not been machined, ceramic filter elements are not of absolutely regular shape, because of deformation or shrinkage occurring during their shaping by extrusion or pressing, their drying and their sintering. To give an example, the actual shape of a theoretically cylindrical tubular element generally differs from the ideal cylinder in a number of respects:
the axis of the element is not exactly a straight line (being curved or crooked),
the cross-section of the element is not a perfect circle, but rather an approximately elliptical curve, and
the dimensions and orientation of the main axes of this ellipse are not constant along the tube and vary from one tube to another.

Also, the end of the separator element may be coated with a material such as an enamel whose function is to prevent passage of the liquid from the retentate cavity to the permeate cavity via the relatively coarse pores of the support. This enamel covers the end surface of the separator element and a portion of its lateral surface, producing a more or less regular locally increased thickness.

These imperfections of shape, although small and sometimes imperceptible to the unaided eye, nevertheless make it impossible in practise to assemble ceramic elements into a rigid end plate comprising housings of accurately dimensioned size by means of preformed polymer seals of precise shape and size. The use of such seals would have the following disadvantages:
the occurrence of leaks if the transverse dimensions of the ceramic element are too small or too irregular,
the impossibility of fitting elements whose transverse dimensions are too large, and
the generation of very high stresses, which can be high enough to rupture the ceramic element when, after fitting, the seal is to be compressed by clamping to ensure a tight seal.

One known method for overcoming this problem is to carry out the assembly process using a seal made from a silicone rubber which is first cast in situ in liquid form, so as to adapt to the irregular shape of the ceramic elements, and then polymerized to confer on it its final shape, being then compressed by clamping it between two metal plates.

This type of assembly is perfectly satisfactory with regard to the sealing function, the retention in place of the ceramic elements and the absorption of differential thermal expansion between the ceramic and the casing. It is of limited utility, however, in that the elastomer compounds that have to be shaped in this way by casting without pressure are unable to meet all requirements with regard to resistance to corrosive liquids and solvents.

To be of general use, this type of filter has to be usable to filter or separate corrosive fluids (acids, bases, oxidizing fluids, etc) and organic solvents (hydrocarbons and others) as well as enabling use of such fluids for cleaning the separator membrane.

The limitations of seals cast in situ are apparent in the case of silicone rubbers which are highly resistant to acids, bases and oxidizing fluids, but which when exposed to organic solvents swell considerably with deterioration of their mechanical characteristics rendering them unusable as seal materials.

An object of the present invention is to avoid these disadvantages and to provide an assembly method which makes it possible to use a wide variety of compounds for the materials of the seals.

SUMMARY OF THE INVENTION

In one aspect, the invention consists in a method of assembling a module made up of parallel substantially tubular separator elements comprising ceramic supports with the ends of each element fixed via flexible seals into openings in two end plates attached to a protective casing, in which method:

seal blanks are molded from an elastomer material that is resistant to organic solvents and to corrosive liquids and has a Shore A hardness between 30 and 95 and an elastic elongation per unit length in excess of 10%, each blank having an outside surface of any form and an internal cavity with a surface matched to the ideal external shape of a separator element, except that its dimensions are slightly smaller than the corresponding dimensions of said separator element, said blanks are fitted onto the ends of said separator elements, the outside surfaces of said blanks are machined to match them to the shape of said openings in said end plates, so producing said seals, and said elements are fitted into said casing between said plates in such a way as to hold said seals in compression between said elements and said plates.

Choosing a suitable machining process (grinding, turning or localized melting, for example) for the elastomer material used makes it possible to achieve a surface that is sufficiently smooth and regular to give a good seal.

In a first embodiment, said blanks are machined to a frustoconical shape open towards the interior of said casing with a shoulder adapted to enter into abutting engagement with the end of the corresponding filter element.

In another embodiment, each seal is adapted to be compressed between the associated end plate and a plate parallel to said associated end plate and attached to said casing.

In another embodiment, said associated end plate and said plate parallel thereto incorporate frusto-conical openings facing towards each other and said blanks are machined to form two matching frustoconical ends with a cylinder between them.

In this case, said blanks may be machined so that said cylinder has an outside diameter larger than the largest diameter of said frustoconical ends and comprises annular end surfaces through which it bears on the two plates between which it is clamped.

In another embodiment, said associated end plate and said plate parallel thereto incorporate part-spherical openings and said blanks are machined to form matching part-spherical ends.

The choice of a shape is, of course, dictated by the need to minimize dead space and overall dimensions within the module.

In another aspect, the present invention consists in a filter module comprising a plurality of parallel substantially tubular separator elements each comprising a ceramic support, a protective casing, two apertured end plates attached to said protective casing and flexible seals whereby each element is fixed into respective apertures in said end plates, said module being assembled by a method in which:

seal blanks are molded from an elastomer material that is resistant to organic solvents and to corrosive liquids and has a Shore A hardness between 30 and 95 and an elastic elongation per unit length in excess of 10%, each blank having an outside surface of any form and an internal cavity with a surface matched to the ideal external shape of a separator element, except that its dimensions are slightly smaller than the corresponding dimensions of said separator element, said blanks are fitted onto the ends of said separator elements, the outside surfaces of said blanks are machined to match them to the shape of said openings in said end plates, so producing said seals, and said elements are fitted into said casing between said plates in such a way as to hold said seals in compression between said elements and said plates.

Other characteristics and advantages of the present invention will emerge from the following description of embodiments thereof given by way of non-limiting example only and with reference to the appended schematic drawings.

BRIEF DESCRIPTION OF THE DRAWINGS

FIGS. 6A, 6B and 6C show in schematic cross-section three embodiments of the end of a ceramic separator element in an assembly obtained using the method in accordance with the invention.

FIGS. 7, 8 and 9 show in schematic cross-section other embodiments of the method in accordance with the invention.

DESCRIPTION OF THE PREFERRED EMBODIMENTS

Figure 1:
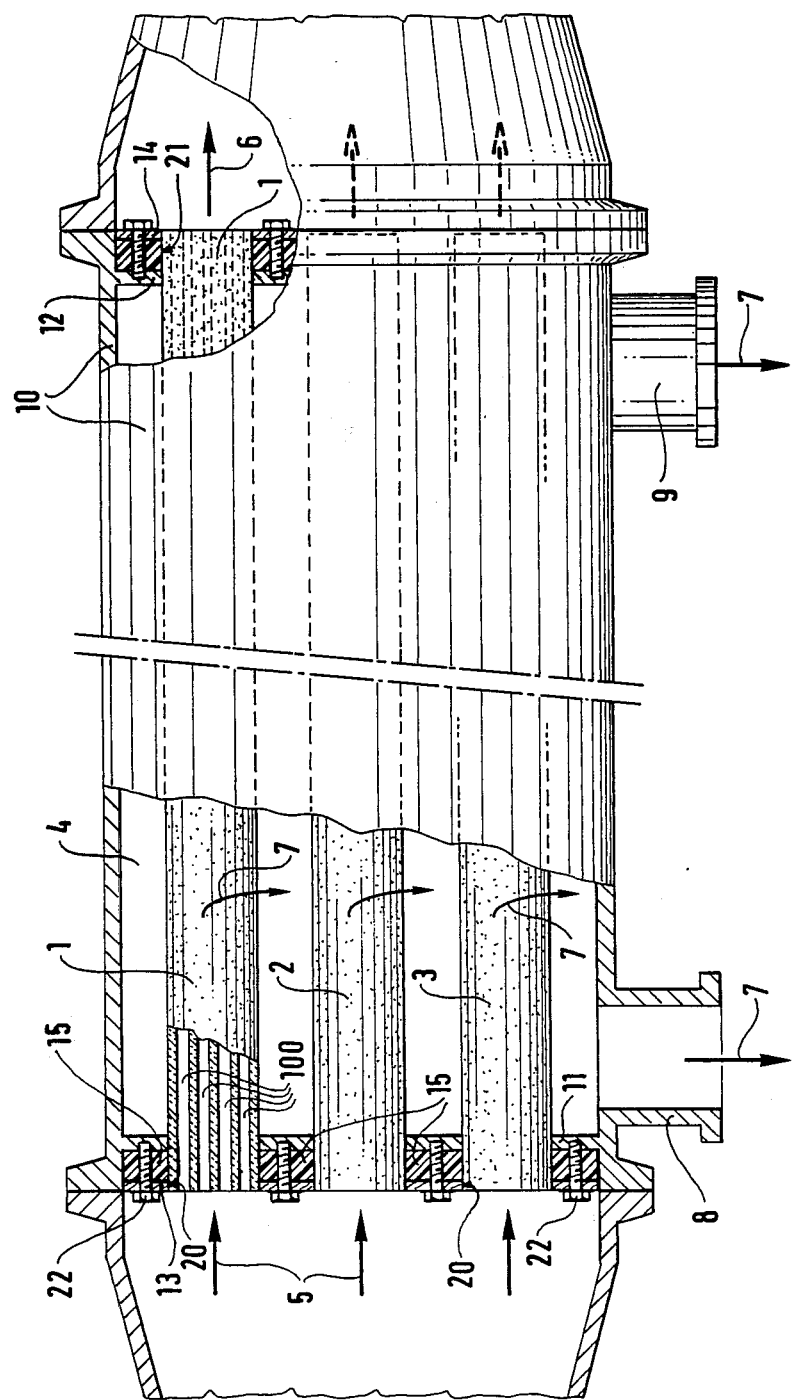
FIG. 1 is a schematic and partially cut away view in elevation of a separator element module assembled by means of a prior art method.

FIG. 1 shows in a highly schematic way three multi-channel separator elements 1, 2, 3 of a prior art module.

Each element comprises an oblong ceramic block of substantially hexagonal transverse cross-section through which extend a plurality of parallel channels 100. These separator elements 1, 2, 3 are housed in a metal casing 10, through the end walls 11 and 12 of which the elements 1, 2, 3 pass. Sealing at this level is provided by means of metal end plates 13 and 14 featuring openings 20 and 21 and fitted with intermediate seals 15, the assembly being fastened by screws schematically represented at 22.

The liquid to be filtered, schematically represented by the arrow 5, enters through the openings 20 in the plate 13, circulates inside the channels 100 of the elements 1, 2, 3 and leaves through the openings 21 in the plate 14 (arrows 6). The permeate (arrow 7) circulates in the space 4 defined by the interior of the casing and the outside of the separator elements 1, 2, 3 and leaves via outlets 8 and 9.

Figure 2:
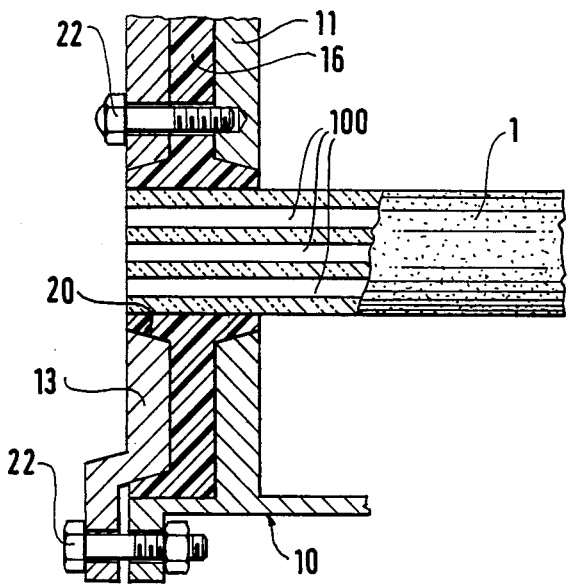
FIG. 2 is a schematic view in cross-section showing in more detail a prior art seal from the FIG. 1 module.

FIG. 2 shows a known implementation of the seals 15 from FIG. 1. The multi-channel elements, such as the element 1, having been placed in the casing 10 and inserted into the openings 20 in the end plates, such as the plate 13, a silicone rubber seal 16 is cast in situ and, after it has polymerized, is then compressed by tightening the screws 22. This seal is not resistant to organic solvents and there are no other castable elastomer materials available capable of overcoming the problem this presents.

Figure 3:
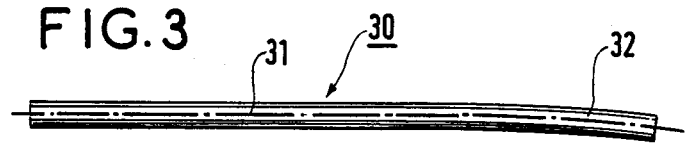
FIG. 3 is a view in elevation showing how a ceramic separator element that can form part of a module in accordance with the invention may be bent or crooked.
Figure 4:
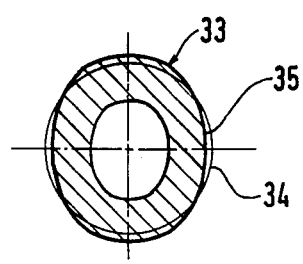
FIG. 4 is a view in cross-section showing how a ceramic separator element that can form part of a module in accordance with the invention may depart from the ideal cylindrical shape.

FIGS. 3 through 5 show various geometrical defects that ceramic separator elements may feature and which complicate their assembly into modules.

Thus FIG. 3 shows an element 30 whose axis 31 departs from the ideal straight line towards its end 32: it has the defect of being bent or crooked.

FIG. 4 shows an element 33 whose contour in cross-section is not the ideal circle 34 but rather an oval 35.

Figure 5A:
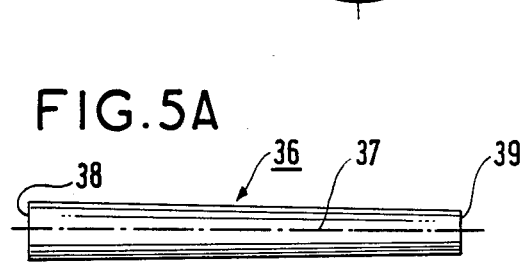
FIGS. 5A and 5B respectively show in elevation and transverse view another typical defect of ceramic separator elements.
Figure 5B:
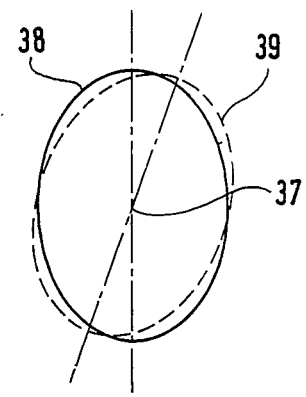

Finally, FIG. 5A shows an element 36 with axis 37 having an elliptical transverse cross-section which varies from one end 38 to the other end 39, as shown more clearly in FIG. 5B: in this instance there is a "conicity" defect in combination with an "ovalness" defect.

FIG. 6A shows an assembly obtained using the method in accordance with the invention; it comprises the separator element 1, the plate 11 of the casing 10 featuring a housing 40, the end plate 13 featuring a housing 41 and the screws 22.

The walls of the housings 40 and 41 are machined to frustonical shapes of precise dimensions.

In accordance with the invention, a seal blank is produced by pressurized molding, injection molding or any other conventional elastomer shaping process from an elastomer material selected for its resistance to corrosive fluids and organic solvents; this elastomer must have an elastic elongation per unit length in excess of 10% and a Shore A hardness between 30 and 95.

The surface 43 of the internal cavity in the blank corresponds to the ideal external surface of an element 1 (circular cross-section cylinder, hexagon, etc, as appropriate to the element 1 in question), but with very slightly smaller dimensions, for example with a diameter smaller by 0.2 to 0.6 mm. The blank can have any shape external surface, cylindrical, for example.

The blank is fitted over the imperfect end of the element 1 by slightly stretching the elastomer. Because of its elasticity, the blank grips this end perfectly and a good seal is obtained between the blank and the separator element 1. On the other hand, the geometrical defects of the outside surface of the element 1 are transferred to the outside shape of the blank which cannot, of course, coincide with the frustoconical housings 40 and 41. This outside shape is then altered by machining, grinding, turning, localized melting, laser cutting or high-pressure liquid jet cutting, or any other appropriate process, so as to confer on the surface of the blank precisely defined geometrical shapes corresponding to those of the housings 40 and 41. For grinding, for example, use may be made of silicon carbide grinding wheels with a peripheral speed of 5 to 40 meters per second.

There is obtained in this way a seal 42 with two frustoconical ends 44 and 45 and an intermediate cylinder 46 whose diameter is greater than the largest diameter of the cones and which has annular end surfaces 47 and 48. These are respectively applied against the surfaces 27 and 28 of the plates 13 and 11. When clamping is applied by the screws 22 the flexible seal 42 is compressed and applied perfectly to the frusto-conical housings in the plates 11 and 13 and against the separator element 1.

In the case of FIG. 6A, the surface of the housings 40 and 41 in the plates at both ends of the element is a surface of revolution about a common axis; the outside surface of the two blanks may be shaped by rotating the element carrying them about an axis coinciding approximately with the axis of the element and machining the two outside surfaces simultaneously. In this way outside surfaces of revolution are obtained.

If required for the purpose of carrying out the fitting into the end plates, the seals may be removed after shaping, after marking the exact orientation of each seal relative to the end of the separator element it matches, and the elements and the seals are then fitted into the end plate, each seal being refitted precisely to the end of the element to which it corresponds, in the appropriate orientation.

There results a bundle of separator elements mounted between two end plates by means of elastic seals whose internal surface is perfectly molded to the end of the element in spite of its irregular shape and whose outside surface matches exactly to the shape of the housing in the end plate.

In the embodiment shown in FIG. 6B, the seal 52 further comprises an end shoulder 53 which is applied against the end surface of the separator element 1 and serves as an abutment.

In the embodiment shown in FIG. 6C the shoulder 53 of the seal in FIG. 6B is butted up against a corresponding shoulder 54 forming part of the plate 13 and following on from the frustoconical surface 41. An embodiment of this kind secures excellent retention in place of the separator element 1.

In the embodiment shown in FIG. 7 there is no longer used at each end of the separator elements a pair of plates and a device for clamping these plates which compresses the seal, but rather single end plates 61 and 62 and a clamping device which compresses two seals 63 and 64 at the same time. Each of these seals has a frustoconical external shape with an end shoulder butted up against the end of the separator element 1. The frustoconical surfaces are machined for optimum fitting to the shape of housings 65 and 66 provided in the plates 61 and 62.

In the embodiment shown in FIG. 8, an arrangement with two plates 71 and 73 fixed by screws 22 is used, as in FIG. 6C.

After machining, the seal 72 has two frustoconical ends 74 and 75 and a shoulder 76 which buts up against a shoulder 77 on the plate 73 and also against the end of the element 1; a cylindrical part 78 between the two frustoconical ends 74 and 75 does not have any surfaces bearing against the plates 71 and 73, like the seal 52 in FIG. 6C.

In the embodiment shown in FIG. 9 the seal 82 between the plates 81 and 83 has an outside surface 84 machined to part-spherical shape matching respective housings 85 and 86 provided in the plates.

Figure 10:
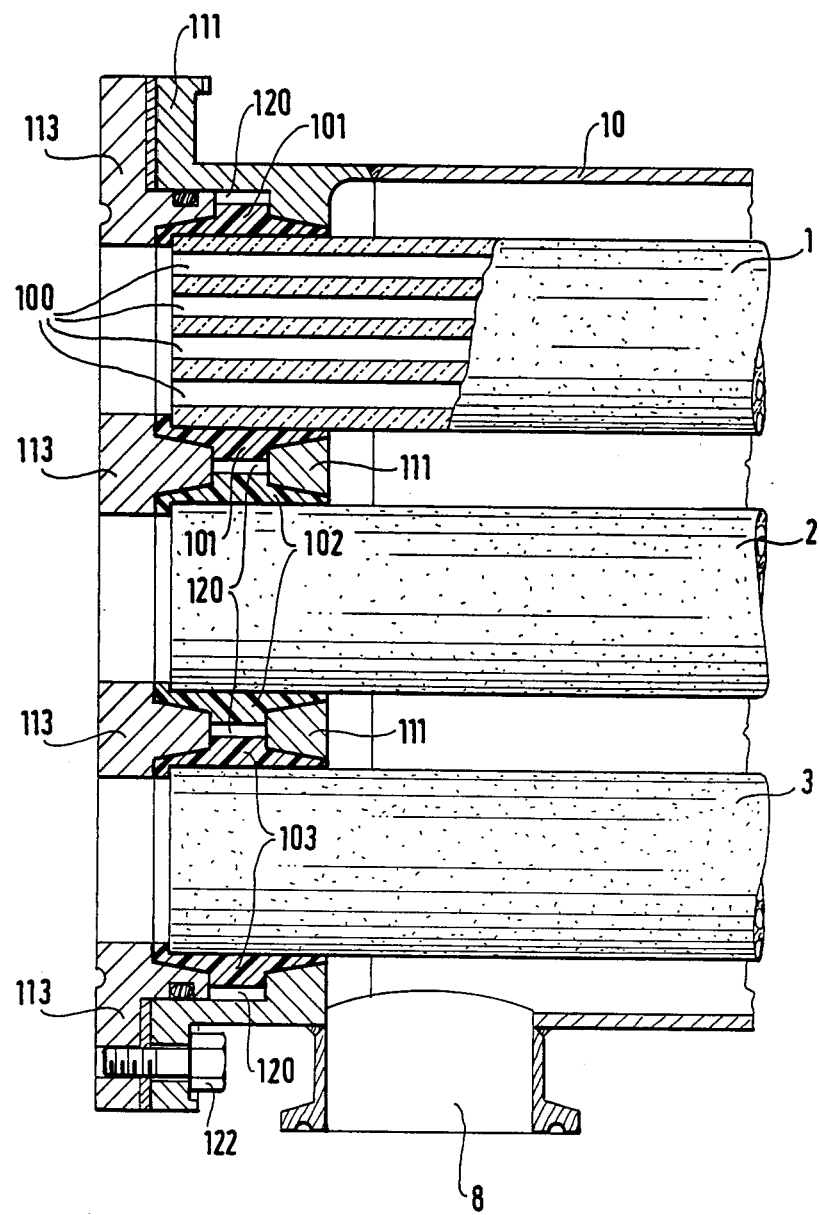
FIG. 10 shows in partial cross-section a module in accordance with the invention.

FIG. 10 shows part of a module in accordance with the invention, of which three separator elements 1, 2, 3 and the casing 10 with an end flange 111 cooperating with an end plate 113 are seen. Seals 101, 102, 103 analogous to the seal 52 in FIG. 6C and threaded respectively onto the separator elements 1, 2, 3 provide a seal between each element and the flange 111 and between each element and the plate 113 fixed to the flange 111 by screws 122.

This separator module has the following advantages:

The seals 101, 102, 103 are held in compression and secure at the same time a very good seal and excellent retention in place of the separator elements 1, 2, 3 combined with excellent durability of the seals as they are in compression.

The seals are removable, which makes it easy to change a single separator element should this be required (which is not the case with the FIG. 2 arrangement).

Nowhere in the end part of the module, either on the retentate side or on the permeate side, is there any small corner that is difficult to clean where microorganisms could develop in an uncontrolled way: thus the module can be used to filter foodstuff products, for example.

The cavities for the fluid to be treated and for the permeate are separated by a common empty space 120 at each end between the flange 111 and the plate 113 and the polymer seals. This empty space can communicate with the exterior of the module, which has the following advantages:

Should any of the seals develop a leak, the liquid will flow from one cavity to the outside rather than into the other cavity.

This empty space 120 can be used to sterilize the end of the module by the very effective method of injecting superheated steam.

In the event of an increase in temperature the polymer seals, which have a thermal coefficient of expansion greater than that of ceramic and of metal, can expand into the empty space 120 between the plate and the flange without such expansion producing high stresses, as is the case with a polymer seal cast by the prior art method and filling all of the space between the two plates.

There follow some typical examples of practical applications of the method in accordance with the invention.

EXAMPLE 1

Filter elements are made from porous alumina having the multi-channel form described in the previously mentioned publications, comprising 19 channels with an inside diameter of 4 mm and the external shape of a regular hexagonal prism with a distance of approximately 29 mm between opposite plane surfaces and a total length 850 mm. The edges of the hexagonal prisms do not form sharp corners; instead the lateral surfaces of the prism merge with one another through a part-cylindrical fillet with a radius of 4.2 mm. The surface of the channels is coated with a layer of alumina having a pore diameter of 0.2 μm.

The FIG. 10 module is to be assembled from 19 of these elements, which feature the following imperfections of shape:

The distance between the opposite surfaces of the hexagonal prism at the ends of the elements varies between 28 and 30 mm.

One end of the multi-channel structure is not perfectly straight, but rather slightly curved ("crookedness" defect as shown in FIG. 3). At this end the angle between the axis of the hexagonal prism and the mean axis defined over the overall length of the element varies between 1° and 2°, depending on the element concerned.

Figure 11A:
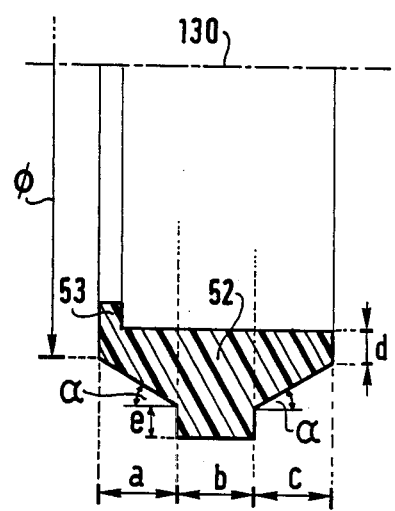
FIGS. 11A and 11B show in partial cross-section to a larger scale a first type of seal associated with its clamping plates in accordance with the invention, as in FIG. 6C.
Figure 11B:
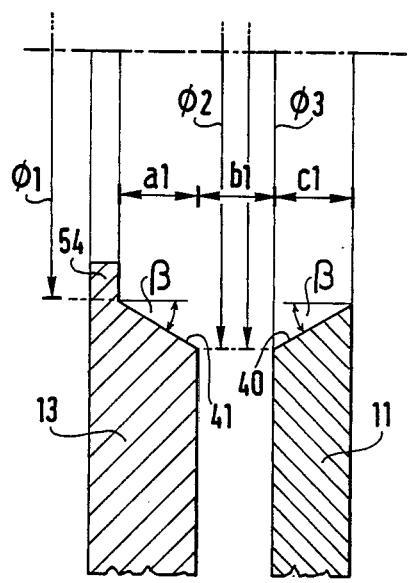

The assembly to be obtained is like that shown in FIG. 6C; the seal 52 from FIG. 6C is shown in more detail in FIG. 11A and FIG. 11B shows the housings 40 and 41 in the plates 13 and 11.

The seal blank 52 is obtained by molding a VITON brand fluorinated elastomer manufactured by DU PONT DE NEMOURS, which has a Shore A hardness of 60. The surface of its internal cavity is a regular hexagonal prism with a distance of 27.5 mm between flats and a part-cylindrical fillet between surfaces having a radius of 4 mm; its outside surface is a cylinder with an outside diameter of 50 mm; its length is 30 mm. At one end is an inwardly projecting rectangular profile shoulder 53.

One of these blanks is placed on each end of each of the 19 elements.

Each element is successively rotated about an axis approximating its means axis 130 and at a speed of 120 revolutions per minute. The outside surface of the blank is ground to the shape of the seal 52 as shown in FIG. 11A.

The angle $\alpha$ of the cones may be between 3° and 60° and preferably between 5° and 20°.

a, b, c, are the respective dimensions as measured parallel to the axis 130 of the frustoconical end near the plate 13, the intermediate cylinder and the frustoconical end near the plate 11; e is the height of the surface through which the intermediate cylinder bears on the end plate; d is the smallest thickness of the seal; $\phi$ is the smallest diameter of the frustoconical ends.

The dimensions b, c, d and satisfy the following equations:

$$0.5 < (a+b+c)/\phi < 2$$

$$0.05\phi < d < 0.3\phi$$

$$0.1\phi e < 0.4\phi$$

The ratio of each of the dimensions a, b, c to either of the others is between 1:3 and 3:1.

In this specific example:
$\alpha = 10°$
$a = b = c = 10$ mm
$e = 4$ mm
$\phi = 36$ mm The separator elements fitted with their seals 52 are fitted into the openings in the plates 11 and 12 which have the following dimensions:
$a1 = b1 = c1 = 10$ mm
$\beta = 10°$
$\phi2 = \phi3$
$\phi1 = 36$ mm Sealing is obtained by clamping the two plates 11 and 13 by means of the screws 22 until the gap b1 is reduced to 8 mm. This compresses the seal which deforms by virtue of its elasticity to provide an excellent seal up to a pressure of at least 100 bars applied to either side of the end plates.

EXAMPLE 2

Tubular elements are made from porous alumina having an inside diameter of approximately 15 mm, an outside diameter of approximately 19 mm and a length of 750 mm, the inside surface being coated with a microporous layer in which the pores have a diameter of 40 Angstrom units, as described in the publications previously mentioned.

A module is to be assembled from these tubes which have the following shape imperfections:
The outside perimeter of the cross-section of each end approximates a nearly circular ellipse ("ovalness" defect as shown in FIG. 5B), the major and minor ellipse axes being:

| at end A | 18.3 mm and 18.9 mm |
|---|---|
| at the other end B | 18.7 mm and 19.7 mm |

The average outside diameter is thus 18.6 mm at end A and 19.2 mm at end B ("conicity" defect as shown in FIG. 5A).

Figure 12A:
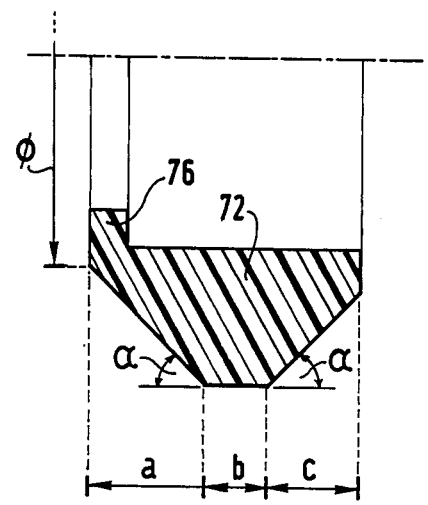
FIGS. 12A and 12B show a second type of seal associated with its clamping plates in accordance with the invention, as in FIG. 8.
Figure 12B:
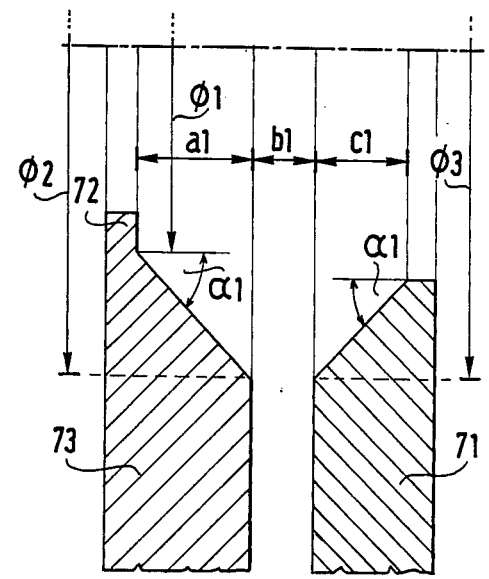

To obtain the assembly in accordance with the invention:
A conventional molding process is used to make nitrile rubber seal blanks with a Shore A hardness of 30 and the following shape:
Cylindrical inside surface of 18 mm diameter.
Cylindrical outside surface of 60 mm diameter.
Total length 35 mm.
An inwardly projecting rectangular profile shoulder 76 at one end.
One of these blanks is fitted to each end of each tube.
The tube is rotated about an axis approximating its mean axis at a speed of 180 revolutions per minute.
The outside surface of the two blanks is machined to obtain a seal 72 having a shape as shown in FIG. 8 and FIG. 12A, with the following dimensions:
$a = 15$ mm
$b = 8$ mm
$c = 12$ mm
$\alpha = 45°$
$\phi = 26$ mm
using a porous structure silicon carbide grinding wheel with a vitreous binder and a grit size of 45 (as per AFNOR French standard NF X 11.501).
The angular position of the seal 72 at end A is marked relative to a generatrix of the tube and the seal is removed.
The tube is fitted into a metal casing by means of end plates as per FIG. 8. Plates 71 and 73 are used with housings of the shape shown in FIG. 12B and the following dimensions:
$a1 = 15$ mm
$c1 = 12$ mm
$\alpha 1 = 47°$
$\phi 1 = 26$ mm
$\phi 2 = \phi 3$
The tube is fitted by first threading its end A into the housings of the internal end plates, then fitting the end B external end plate, then fitting the end A seal by threading it over the tube in the previously marked position, then fitting the end A external plate.
Clamping is then effected as in example 1 so that b1 becomes less than b.

EXAMPLE 3

Filter elements are made from porous alumina having a multi-channel structure comprising 19 channels similar to that for example 1, except that the diameter of the channels is 6 mm and the outside shape is a regular hexagonal prism having a distance of approximately 38 mm between opposite plane surfaces and a part-cylindrical fillet between these surfaces with a radius of 6.3 mm. The internal surface of the channels is coated with a layer of porous alumina having a pore diameter of 3 $\mu$m. The length of the element is 850 mm.

Figure 13A:
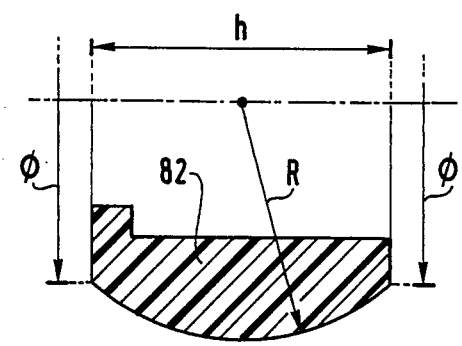
FIGS. 13A and 13B show a third type of seal associated with its clamping plates in accordance with the invention, in an assembly analogous to that of FIG. 9.
Figure 13B:
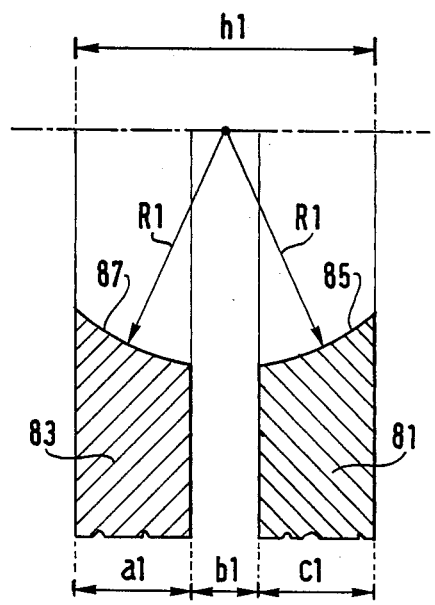

A module is to be assembled from 12 of these elements, which feature the following shape imperfections:
The distance between the opposite surfaces of the hexagonal prism at the ends of the elements varies between 37 and 39 mm.
At some ends of some elements the hexagon is slightly flattened, meaning that the angles at the corners are between 59° and 62°.
To carry out the assembly:
A molding process is used to obtain seal blanks in EPDM (Ethylene-Propylene-Diene-Monomer) with a Shore A hardness of 80 and the following shape:
the inside surface is a hexagonal prism with a distance of 36.5 mm between opposite plane surfaces and a part-cylindrical fillet between these surfaces with a radius of 6 mm,
the outside surface is a cylinder with a diameter of 70 mm,
the total length h is 38.5 mm.
One of these blanks is fitted to each end of each of the 12 elements.
Each element in turn is rotated about an axis approximating its mean axis at a speed of 2,000 revolutions per minute.
The seal is machined by turning to obtain a seal 82 having the shape shown in FIG. 13A; the part of the seal that will come into contact with the end plates is part-spherical with a radius $R = 30$ mm.
The diameter $\phi$ is 46 mm.
Assembly into the casing is carried out as in example 1, using end plates 81 and 83 as shown in FIGS. 9 and 13B.
The housings 85 and 87 have the following dimensions:
$a1 = 15$ mm
$b1 = 8.5$ mm
$c1 = 15$ mm
$R1 = 30$ mm
$h1 = 38.5$ mm
Sealing is obtained by bonding the seal: during assembly the inside and outside surfaces of the seal are coated with an epoxy adhesive. After assembly and polymerization of the adhesive there is obtained a seal which is fluid-tight to a pressure of ten bars. If during the assembly process the surfaces of the seal and the housings in the plate are not exactly aligned, the plates are moved very slightly towards each other (reducing the dimension b1) before the adhesive polymerizes.

EXAMPLE 4

The requirement is to assemble a module of seven separator elements as described in example 1 with seals 63, 64 compressed axially as shown in FIG. 7.

To this end, seal blanks are made from a neoprene rubber with a Shore A hardness of 70, the internal surface of which is a regular hexagonal prism having a distance of 27.5 mm between flats, a part-cylindrical fillet between these surfaces with a radius of 4 mm, and the outside surface of which is a cylinder of 52 mm diameter 30 mm long.

Figure 14A:
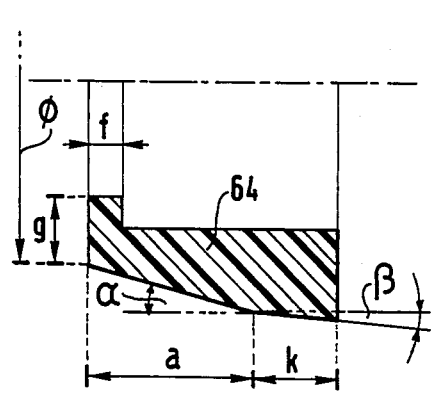
FIGS. 14A and 14B show a fourth type of seal associated with its clamping plate in accordance with the invention, as in FIG. 7.

The outside surface of these blanks is machined by grinding as in example 1 to obtain a seal 64 of the shape shown in FIG. 14A with the following dimensions:

a=20 mm
k=10 mm
g=8 mm
f=4 mm
$\phi$=42 mm
$\alpha$=15°, $\beta$=3°

Figure 14B:
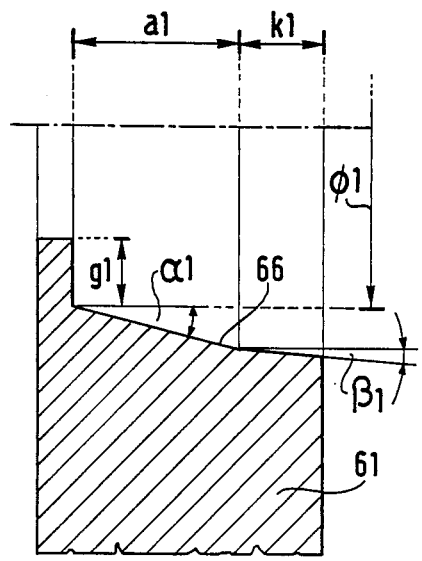

The elements are then fitted into a metal casing by means of end plates 61 comprising housings 66 as shown in FIG. 14B with the following dimensions:

a1=20 mm
k1=10 mm
g1=8 mm
$\phi$1=42 mm
$\alpha$1=14°, $\beta$1=3°

There is only one plate at each end. To obtain the seal the end plates 61, 62 are moved towards each other over a distance of 2 mm from the position in which they just touch the end surface of the seals. This compresses the seals against the plates and against the ceramic elements and thus provides the seal.

It is to be understood that the invention is not limited to the examples that have just been described in detail. It is possible without departing from the scope of the invention to modify, in particular, the shape of the seals, that of the associated housings and the means for compressing the seals.

There is claimed:

1. Method of assembling a module made up of parallel substantially tubular separator elements having geometric defects on the outside surface thereof comprising ceramic supports with the ends of each element fixed via flexible seals into openings in two end plates attached to a protective casing, in which method:
   seal blanks are molded from an elastomer material that is resistant to organic solvents and to corrosive liquids and has a Shore A hardness between 30 and 95 and an elastic elongation per unit length in excess of 10%, each blank having an outside surface and an internal cavity with a surface matched to the ideal external shape of a separator element, except that its dimensions are slightly smaller than the corresponding dimensions of said separator element,
   said blanks are fitted by stretching onto the ends of said separator elements wherein geometrical defects of the outside surface of the elements are transferred to the outside shape of the blanks,
   the outside surface of said blanks are machined to alter them to confer to the outside surface of the blanks precisely defined geometrical shapes matched to the shape of said openings and said end plates, so producing said seals, and
   said elements are fitted into said casing between said plates and said seals are placed in compression between said elements and said plates thereby resulting in a bundle of separator elements mounted between two end plates by means of elastic seals whose internal surface is perfectly molded to the end of the element in spite of its irregular shape and whose outside surface matches exactly to the shape of the housing in the end plate.

2. Method according to claim 1, wherein said blanks are machined to a frustoconical shape open towards the interior of said casing with a shoulder adapted to enter into abutting engagement with the end of the corresponding separator element.

3. Method according to claim 1, wherein each seal is adapted to be compressed between the associated end plate and a plate parallel to said associated end plate and attached to said casing.

4. Method according to claim 3, wherein said associated end plate and said plate parallel thereto incorporate frustoconical openings facing towards each other and said blanks are machined to form two matching frustoconical ends with a cylinder between them.

5. Method according to claim 4, wherein said cylinder has a diameter larger than the largest diameter of said frustoconical ends and comprises annular end surfaces through which it bears on the two plates between which it is clamped.

6. Method according to claim 3, wherein said associated end plate and said plate parallel thereto incorporate part-spherical openings and said blanks are machined to form two matching part-spherical ends.

7. Method according to claim 1, wherein the method used to machine said blanks is chosen from the group comprising grinding, turning, localized meltings, laser cutting and high-pressure liquid jet cutting.

8. Filter module comprising a plurality of parallel substantially tubular separator elements having geometrical defects on the outside surface thereof each comprising a ceramic support, a protective casing, two apertured end plates attached to said protective casing and flexible seals whereby each element is fixed into respective apertures in said end plates, said module being assembled by a method in which:
   seal blanks are molded from an elastomer material that is resistant to organic solvents and to corrosive liquids and has a Shore A hardness between 30 and 95 and an elastic elongation per unit length in excess of 10%, each blank having an outside surface and an internal cavity with a surface matched to the ideal external shape of a separator element, except that its dimensions are slightly smaller than the corresponding dimensions of said separator element,
   said blanks are fitted by stretching onto the ends of said separator elements, wherein geometrical defects of the outside surface of the elements are transformed to the outside shape of the blanks,
   the outside surface of said blanks are machined to alter them to confer to the outside surface of the blanks precisely defined geometrical shapes matched to the shape of said openings and said end plates, so producing said seals, and
   said elements are fitted into said casing between said plates and said seals are placed in compression between said elements and said plates thereby resulting in a bundle of separator elements mounted between two end plates by means of elastic seals whose internal surface is perfectly molded to the end of the element in spite of its irregular shape and whose outside surface matches exactly to the shape of the housing in the end plate.

9. Module according to claim 8, wherein said blanks are machined to a frustoconical shape open towards the interior of said casing with a shoulder adapted to enter into abutting engagment with the end of the corresponding separator element.

10. Module according to claim 8, wherein each seal is adapted to be compressed between the associated end plate and a plate parallel to said associated end plate and attached to said casing.

11. Module according to claim 10, wherein said associated end plate and said plate parallel thereto incorporate frustoconical openings facing towards each other and said blanks are machined to form two matching frustoconical ends with a cylinder between them.

12. Module according to claim 11, wherein said cylinder has a diameter larger than the largest diameter of said frustoconical ends and comprises annular end surfaces through which it bears on the two plates between which it is clamped.

13. Module according to claim 11, wherein said seals comprise a first frustoconical end of height a and half-angle $\alpha$, an intermediate cylinder of height b, and a second frustoconical end of height c and half-angle $\beta$ and smallest outside diameter $\phi$, and the ratio of each dimension a or b or c to each of the others is between 1:3 and 3:1 and: $3° < \alpha < 60°$ and $0.5 < (a+b+c)/\phi < 2$.

14. Module according to claim 13, wherein said intermediate cylinder comprises an annular shoulder of thickness e and $0.1 \times \phi < e < 0.4 \times \phi$.

15. Module according to claim 10, wherein said associated end plate and said plate parallel thereto incorporate part-spherical openings and said blanks are machined to form two matching part-spherical ends.

16. Module according to claim 8, wherein the method used to machine said blanks is chosen from the group comprising grinding, turning, localized meltings, laser cutting and high-pressure liquid jet cutting.

17. Module according to claim 8, wherein said seal has a smallest outside diameter $\phi$ and a smallest thickness d and $0.05 \times \phi < d < 0.3 \times \phi$.

18. Module according to claim 8, wherein the transverse dimensions of said seals are such that there results between them at each end of said casing an empty space readily sterilizable by injecting steam.

* * * * *